US006490610B1

(12) United States Patent
Rizvi et al.

(10) Patent No.: US 6,490,610 B1
(45) Date of Patent: *Dec. 3, 2002

(54) AUTOMATIC FAILOVER FOR CLIENTS ACCESSING A RESOURCE THROUGH A SERVER

(75) Inventors: Hasan Rizvi, San Carlos, CA (US); Ekrem Soylemez, Arlington, MA (US); Juan R. Loaiza, Redwood City, CA (US); Robert J. Jenkins, Jr., Foster City, CA (US)

(73) Assignee: Oracle Corporation, Redwood Shores, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/866,842

(22) Filed: May 30, 1997

(51) Int. Cl.[7] .................................................. G06F 9/00
(52) U.S. Cl. ........................ 709/101; 709/104; 709/203; 709/204; 709/205; 709/206; 709/207; 707/10; 707/202; 714/2; 714/16
(58) Field of Search ........................ 395/182.02, 182.13, 395/182.17, 182.18, 800, 570, 575; 369/268, 268.9; 364/269.2, 944; 340/172.5; 714/2–6, 16; 707/202, 10; 709/206, 101, 104, 203–207

(56) References Cited

U.S. PATENT DOCUMENTS

| 3,444,528 | A | * | 5/1969 | Lovell et al. | ............. 340/172.5 |
| 4,868,832 | A |   | 9/1989 | Marrington et al. | ........... 371/66 |
| 5,157,663 | A | * | 10/1992 | Major et al. | ................ 371/9.1 |
| 5,179,660 | A |   | 1/1993 | Devany et al. | ............. 395/200 |
| 5,247,664 | A | * | 9/1993 | Thompson et al. | ........... 707/10 |

(List continued on next page.)

OTHER PUBLICATIONS

"Distributed Systems, Concepts and Design", by Coulouris et al., 1994, Adison–Wesley.*
"Workload Balancing in a Distributed Environment", IBM Technical Disclosure Bulletin, Nov. 1995.*
"Local Area Network Server Replacement Procedure" IBM Technical Disclosure Bulletin, Jan. 1995.*
Renu Tewari, et al., "Highly Availability in Clustered Multimedia Servers", (IEEE), Mar. 1996, pp. 645–654.
"CODA: A Highly Available File System for a Distributed Workstation Environment", Mahadev Satyanarayanan, IEEE Transactions on Computers, vol. 39, No. 4, pp. 447–459, Apr. 1990.
"Scalable, Secure, and Highly Available Distributed File Access", Mahadev Satyanarayanan, IEEE Transactions on Computers, vol. 23 5, pp. 9–21, May 1990.

Primary Examiner—Zarni Maung
Assistant Examiner—Nabil El-Hady
(74) Attorney, Agent, or Firm—Hickman Palermo Truong & Becker LLP; Carl L. Brandt; Edward A. Becker (57) ABSTRACT

A method and system for recovering after failure of a first server to which a client was connected for accessing a resource is provided. When it is detected that a connection between the first server and the client has failed, the client is automatically connected with a second server that has access to the resource. After automatically connecting the client, the client accesses the resource through the second server. The client stores information about the state of the session with the first server so that processing can continue where it left off after the client connects with the second server. The client may be pre-connected to the second server prior to the failure of the first server to reduce the latency caused by switching in response to a failure. The second server may be configured to pre-parse the commands that the client issues to the first server to further reduce the latency associated with switching to the second server.

37 Claims, 5 Drawing Sheets

U.S. PATENT DOCUMENTS

| | | | |
|---|---|---|---|
| 5,535,326 A | 7/1996 | Baskey ........................... 714/4 |
| 5,544,313 A | 8/1996 | Shachnai et al. ...... 395/200.01 |
| 5,566,225 A | 10/1996 | Haas ........................ 395/500 |
| 5,566,297 A * | 10/1996 | Devarakonda et al. . 395/182.13 |
| 5,596,720 A * | 1/1997 | Hamada et al. ............. 709/206 |
| 5,633,999 A * | 5/1997 | Clowes et al. ......... 395/182.04 |
| 5,652,908 A | 7/1997 | Douglas .................... 395/800 |
| 5,666,479 A | 9/1997 | Kashimoto ..................... 714/1 |
| 5,696,895 A * | 12/1997 | Hemphill et al. ...... 395/182.02 |
| 5,721,918 A * | 2/1998 | Nilsson et al. .............. 707/202 |
| 5,734,896 A * | 3/1998 | Rizvi et al. ................. 707/202 |
| 5,784,630 A * | 7/1998 | Saito et al. ................. 395/800 |
| 5,796,934 A * | 8/1998 | Bhanot et al. ......... 395/182.02 |
| 5,796,941 A * | 8/1998 | Lita ........................... 713/201 |
| 5,796,999 A | 8/1998 | Azagury ..................... 395/600 |
| 5,819,019 A * | 10/1998 | Nelson ........................... 714/4 |
| 5,832,483 A | 11/1998 | Barker .......................... 707/8 |
| 5,850,507 A * | 12/1998 | Hgai et al. ..................... 714/16 |
| 5,862,362 A | 1/1999 | Somasegar et al. ......... 395/500 |
| 5,867,713 A | 2/1999 | Shrader et al. .............. 395/712 |
| 5,870,545 A | 2/1999 | Davis et al. ........... 395/200.31 |
| 5,890,963 A * | 4/1999 | Yen .............................. 463/42 |
| 5,951,694 A * | 9/1999 | Choquier et al. ............. 714/15 |
| 6,038,677 A | 3/2000 | Lawlor et al. ................. 714/4 |
| 6,047,323 A | 4/2000 | Krause ....................... 709/227 |

* cited by examiner

AUTOMATIC FAILOVER FOR CLIENTS ACCESSING A RESOURCE THROUGH A SERVER

FIELD OF THE INVENTION

The present invention relates to failover mechanisms, and more specifically, to a method and apparatus for implementing an automatic failover mechanism for clients accessing a resource through a server.

BACKGROUND OF THE INVENTION

A typical client-server database system includes a client, a database server, and a database. The client portion includes two main components, a database application and a client driver interface. The database application issues database language commands, such as SQL (Structured Query Language) commands, and provides an interface to a user through a keyboard, screen, and pointing devices such as a mouse. The client driver interface, on the other hand, provides the connection and communication interface between the client and the database server.

A connection is a communication pathway between a client and a database server and a specific connection between a client and a database server is termed a database session. The database server responds to the database language commands sent from the client by executing database operations for accessing and manipulating a physical database. A logical unit of work that is comprised of one or more database language commands is referred to as a transaction.

Contained within the database server is the session state data that reflects the current transaction state of the database session. To initiate a database session, human intervention is required to manually log onto a database application. The logging on process establishes a new database session by connecting a client with a database server.

Normally, the database session lasts from the time the user connects until the time the user disconnects or exits the database application. However, if a database session failure occurs, the connection between the client and the database server is lost. Once the database session fails, the user will observe a visible interrupt in his service as access to the database is terminated. To continue accessing the database, the user must reconnect a client to an active database server. This requires human intervention to manually log back onto the system to establish a new database session.

Besides requiring human intervention to manually log back onto the system, the failure of a database session creates other significant problems to the user. Because the logon process creates a new database session, all previous transactions that were not complete at the time of the failure are lost. Thus the user must resubmit all lost transactions once the connection to the database is reestablished.

Based on the foregoing, it is desirable to provide a mechanism for handling the failure of a database session without requiring someone to perform manual reconnection steps. Additionally, it is also desirable for users not to lose session state data on the occurrence of a database session failure.

SUMMARY OF THE INVENTION

A method and system for recovering after failure of a first server to which a client was connected for accessing a resource is provided. When it is detected that a connection between the first server and the client has failed, the client is automatically connected with a second server that has access to the resource. After automatically connecting the client, the client accesses the resource through the second server. The client stores information about the state of the session with the first server so that processing can continue where it left off after the client connects with the second server.

The client may be pre-connected to the second server prior to the failure of the first server to reduce the latency caused by switching in response to a failure. The second server may be configured to pre-parse the commands that the client issues to the first server to further reduce the latency associated with switching to the second server.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for implementing an automatic failover mechanism for a resource is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
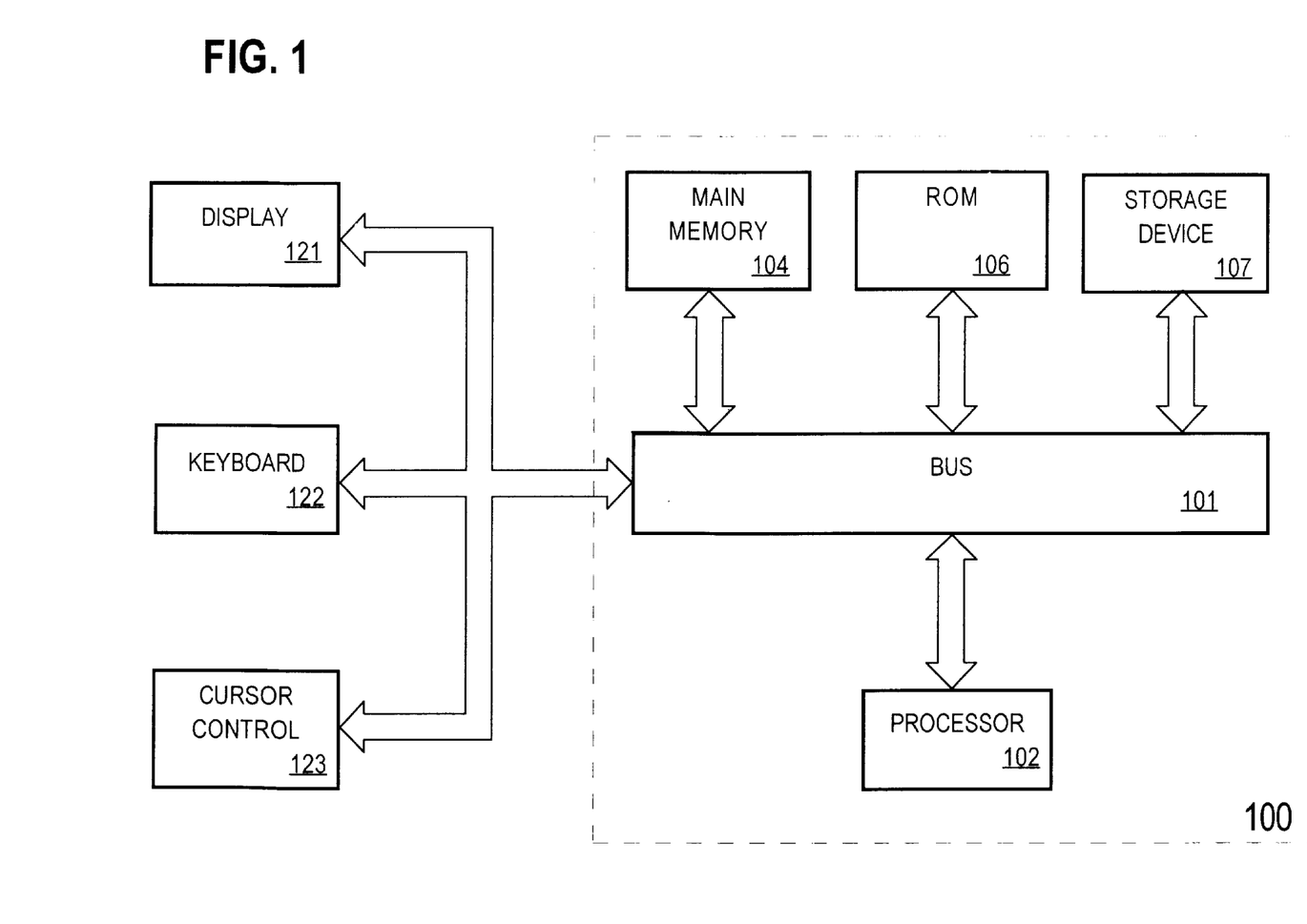
FIG. 1 is a block diagram of a computer system that may be used to implement the present invention.

Referring to FIG. 1, the computer system 100 upon which an embodiment of the present invention can be implemented. Computer system 100 comprises a bus 101 or other communication means for communicating information, and a processor 102 coupled with bus 101 for processing information. Computer system 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

A data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 102. Another type of user input device is cursor control 123, such as a mouse, a track ball, or cursor direction keys for communicating direction information and command selections to processor 102 and for controlling cursor movement on display 121. This input device typically has two degrees of freedom in two axes, a first axis (e.g., x) and a second axis (e.g., y), which allows the device to specify positions in a plane.

The present invention is related to the use of computer system 100 to perform an automatic failover when a database server failure occurs. According to one embodiment, computer system 100 initiates an automatic failover in response to processor 102 executing sequences of instructions contained in memory 104. Execution of the sequences of instructions contained in memory 104 causes processor 102 to perform the steps that will be described hereafter. In alternative embodiments, hard-wired circuitry may be used in place of or in combination with software instructions to implement the present invention. Thus, the present invention is not limited to any specific combination of hardware circuitry and software.

AUTOMATIC FAILOVER

An automatic failover system is a mechanism that can detect a failed connection between a client and a database server and automatically and transparently create a new database session by reconnecting the client to an active database server. The automatic failover mechanism can eliminate the burden of manually re-logging onto the database system whenever a database session failure occurs. In addition, the automatic failover mechanism can provide a method for completing commands and transactions that were interrupted by the database session failure.

Figure 2:
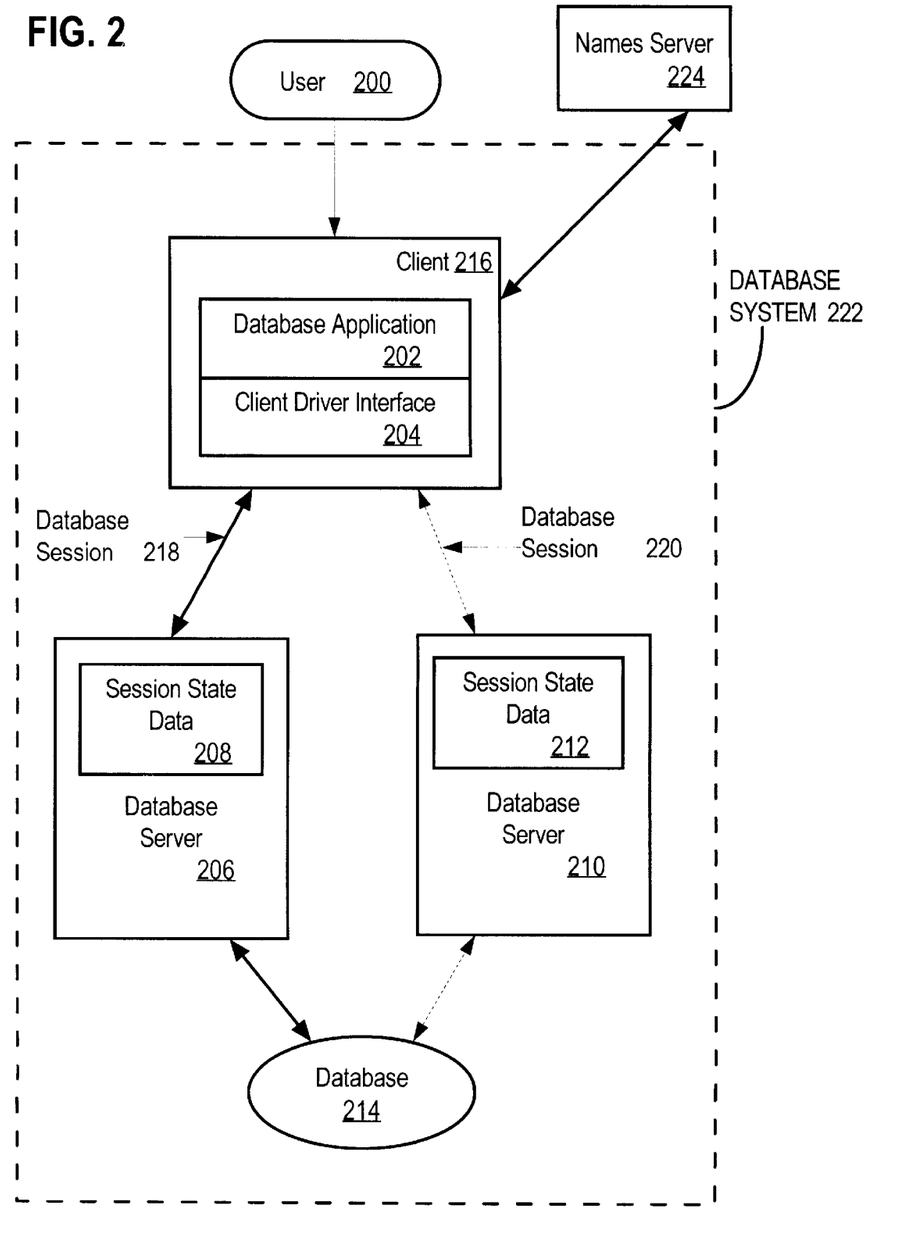
FIG. 2 is a block diagram of a database system in which a client is connected to a database server to provide access to a database.

FIG. 2 is an illustration of a typical database system 222 that supports automatic failover according to one embodiment of the invention. Database server 206 and database server 210 represent two database servers that can provide access to a particular database 214. Client 216 includes database application 202 and client driver interface 204. Database application 202 provides user 200 an interface into database 214 by generating database language commands based on input from user 200 and displaying to user 200 data retrieved from database 214 in response to the database language commands.

Client driver interface 204 is connected to and communicates with database server 206 and database server 210 through database session 218 and database session 220, respectively. Session state data 208 and session state data 212 are respectively contained within database server 206 and database server 210 and reflect the current command and transaction state of database session 218 and database session 220 respectively. Names server 224 contains active database server addresses that may be used by clients to access database 214.

AUTOMATIC FAILOVER SEQUENCE

Figure 3:
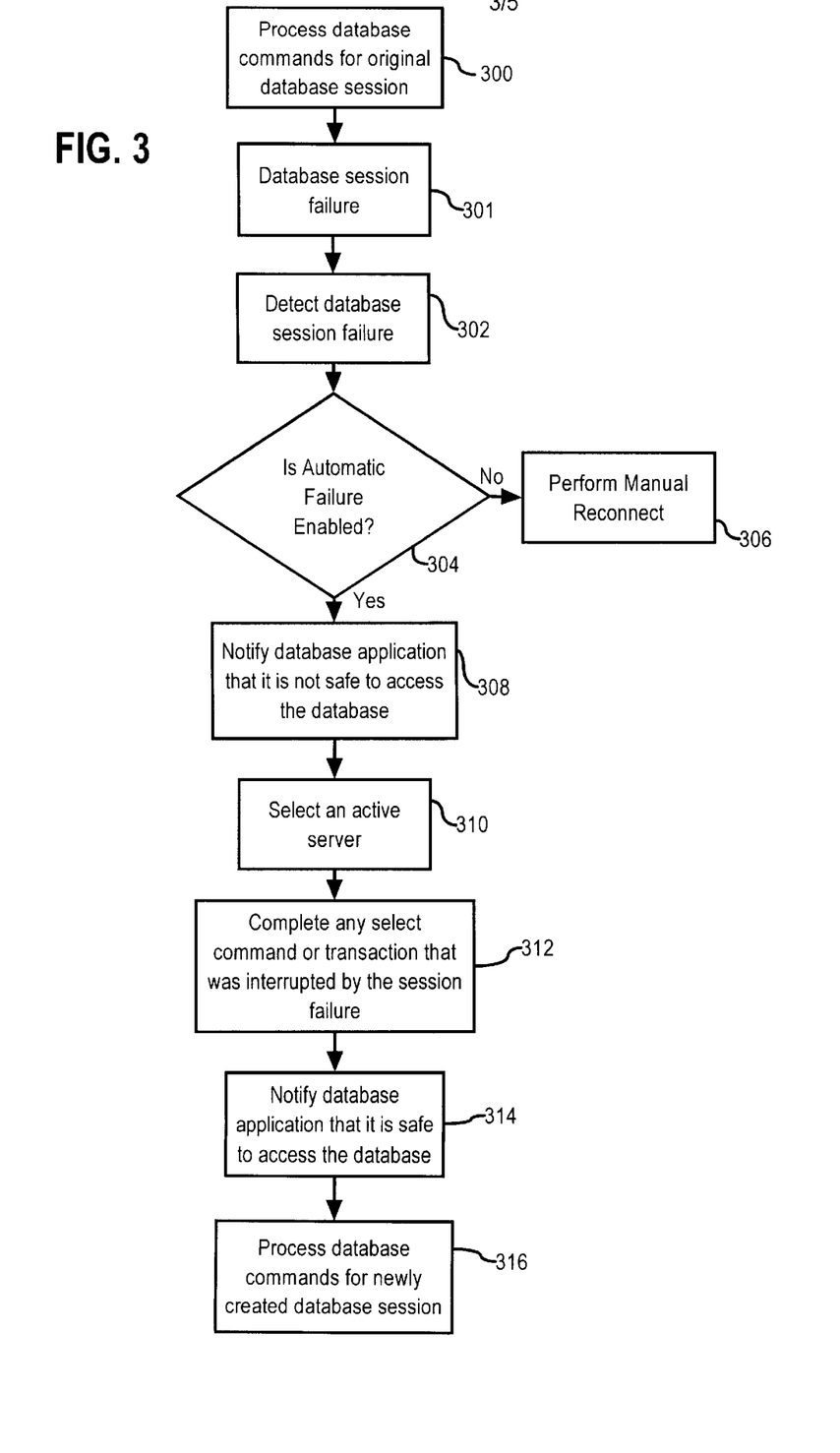
FIG. 3 is a flow chart illustrating steps performed in response to a database server failure according to an embodiment of the invention.

FIG. 3 is a flow diagram illustrating the manner in which an automatic failover mechanism may be implemented according to one embodiment of the invention. According to one embodiment as described in FIG. 3, the configuration of database system 222 before an occurrence of a database session failure is such that client 216 only has access to database 214 by way of database server 206 and database session 218. User 200 accesses database 214 by interacting with the user interface of client 216, causing client 216 to submit database language commands through database session 218.

At step 300, client driver interface 204 is configured to process database language commands that correspond to input from user 200. Client driver interface 204 conveys these database language commands to database server 206 through database session 218. Client driver interface 204 is responsible for establishing and reestablishing the connection and communication controls for interfacing client 216 with database server 206 and, after failure of database session 218, to database server 210. In addition, client driver interface 204 is required to initialize database server 210 and session state data 212 if database session 218 fails.

For example, in one embodiment, client driver interface 204 maintains a record of the state of every command or transaction sent over session 218 that has not completed. When database session 218 fails, this record enables client driver interface 204 to transfer and reestablish the state of interrupted commands or transactions onto database server 210 and session state data 212. Once database server 210 and session state data 212 are initialized, client driver interface 204 can cause the interrupted commands or transactions to continue processing, or at least attempt to continue processing, by communicating commands through database session 220.

At step 301, a failure of database session 218 occurs and the connection between client 216 and database server 206 is lost. At step 302, client driver interface 204 detects the failure of database session 218.

Various techniques may be used to allow client driver interface 204 to detect a failure of database session 218. For example, according to one embodiment, client driver interface 204 asserts a callback request when initiating the connection to database server 206. The connection from client driver interface 204 to database server 206 is through database session 218. The callback request notifies client driver interface 204 when database session 218 fails.

In an alternate embodiment, client driver interface 204 detects a failure of database session 218 by maintaining a timer which times-out when database server 206 fails to respond within a specified amount of time. Client driver interface 204 may then verify that database session 218 actually failed and that the interface did not time-out for another reason.

At step 304, client driver interface 204 verifies that automatic failover is enabled. In one embodiment, user 200 can select whether or not automatic failover is performed on the failure of database session 218. If user 200 has not selected automatic failure and database session 218 fails, not only will manual steps will be required to log back onto database system 222, but session state data 208 will also be lost. Otherwise, in one embodiment, if user 200 enables automatic failover, in step 308 client driver interface 204 notifies database application 202 that it is not safe to continue accessing database 214 through session 218. Client driver interface 204 may also cause user 200 to be notified that database session 218 has failed and that an automatic failover is being performed.

At step 310, client driver interface 204 selects database server 210 to reestablish access to database 214. Various techniques may be used for selecting a database server that allows access to the same resource (database 214) that was being accessed during the failed session.

In one embodiment, a names server 224 is used to determine an appropriate database server to use after a session 218 fails. Names server 224 maintains a list of active servers that can be connected to access to database 214. After obtaining the address of database server 210 from names server 224, client driver interface 204 automatically connects to database server 210 creating database session 220.

When selecting an active database server after the failure of database session 218, client driver interface 204 is not required to choose a different database server (database server 210), from the previously connected database server (database server 206). Although database system 222 depicts client 216 connecting to a different database server (database server 210) when database session 218 fails, database server 206 and database server 210 may actually be the same database server, where database server 210 represents database server 206 after the failure. Thus, when database session 218 fails, client driver interface 204 may choose to reconnect to database server 206 if client driver interface 204 determines that database server 206 is currently active. Database server 206 will be available for reconnecting client 216 to database 214 if, for example, session 218 failed independent of database server 206. Alternatively, database server 206 may become available for reconnecting client 216 to database 214 after recovering from a failure.

For example, client driver interface 204 is connected to database server 206 through database session 218. User 200, although still logged on to database system 222, ceases to access database 214 for some period of time. During this period of time, a backup of database 214 is initiated causing database session 218 to fail. Before user 200 returns to access database 214, the backup of database 214 is completed. When user 200 begins to access database 214, client driver interface 204 may identify database server 206 as active. Client driver interface 204 may then establish database session 218 by reconnecting client 216 to database server 206.

In another embodiment, client driver interface 204 selects database server 210 from a pool of database servers that have access to database 214. The pool of "backup" servers may be established, for example, when user 200 initially logs on. Client driver interface 204 then automatically performs the necessary steps to connect to database server 210 through database session 220. The connection pool can reduce the overhead required in connecting client driver interface 204 to a new database server after the occurrence of a database session failure.

In yet another embodiment, client driver interface 204 is connected with both database server 206 and database server 210 when user 200 initially logs on. The database application 202 interacts with the database 214 through database server 206 over session 218. When session 218 fails, database server 206 then switches to database connection 220 that has already been established. As shall be described in greater detail hereafter, commands issued to database server 206 in session 218 may be pre-parsed in database server 210 to further reduce the overhead associated with switching from database server 206 to database server 210.

At step 312, any select command or transaction that was interrupted by the failure of database session 218 continues processing. In one embodiment, client driver interface 204 maintains a record of the current select commands and transactions being performed. This record provides client driver interface 204 the ability to continue processing any select command or transaction that was interrupted by the failure of database session 218. By replicating the interrupted select commands and transactions on database server 210 once database session 220 is established, client driver interface 204 can continue processing any interrupted select commands or transactions. Because client driver interface 204 can automatically resubmit any interrupted select command or transaction, the process can be transparent to user 200 as manual steps will not be required to resubmit the information.

SELECT OPERATION RECOVERY

Select commands provide users the ability to selectively retrieve specific categories of information or data from a database. Ordinarily, a select command returns the requested data in rows that correspond to the specific attributes of the select command. For example, in the select command "select*from t1 where t1.c1=100," the specific attributes of the select command return all rows of data from table t1 where the column 1 of table t1 is equal to 100.

Because the information in a database is constantly changing, a user cannot normally be guaranteed to receive the same data from one select command to the next, even if both select commands contain the same select attributes. Thus, results returned in response to execution of a select command reflect a particular snapshot of the database (i.e. the database at a specific instance in time).

Typically, whenever a select command is executed, a timestamp or sequence number is used to determine the specific snapshot or state of the database from which data will be retrieved during the execution of the select command. This database timestamp represents a specific state of the database and allows a database server to retrieve consistent data, even as information in the database is modified.

The timestamp used during the processing of one select command can also be used by a database sever to retrieve the same information when executing subsequent select commands. However, although using the same database timestamp to select separate executions of a select statement guarantees that the two executions return the same information, the order in which rows are returned cannot be guaranteed. In other words, the row order of data returned by a select command is not deterministic.

Figure 4:
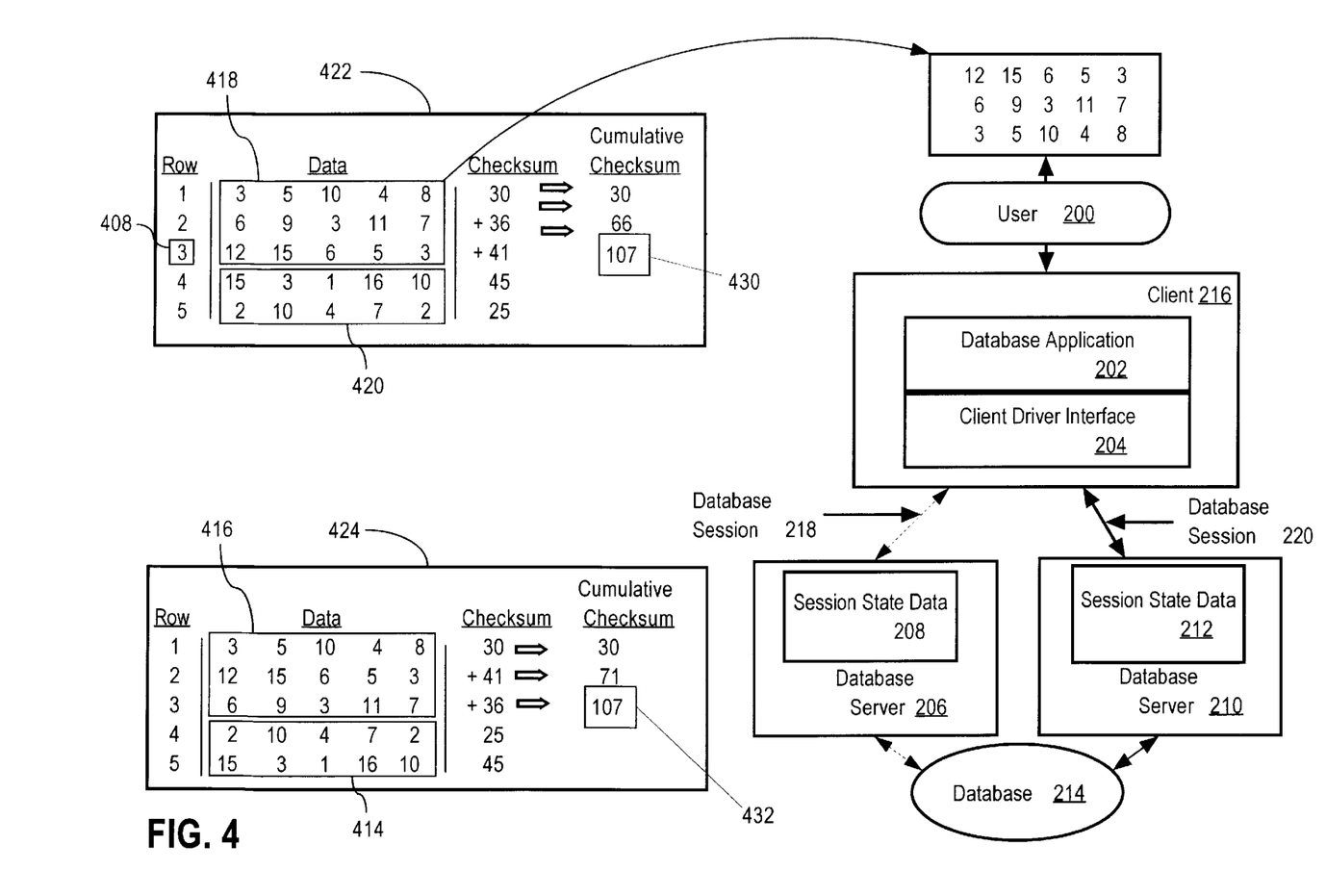
FIG. 4 is a diagram illustrating how checksums can be utilized for completing select commands that were interrupted by a database session failure according to an embodiment of the invention.

To continue processing an interrupted select command, a client must be able to determine which rows of data were previously received from the failed database session, and whether the ordering of rows from a subsequent execution of the select command will enable the client to continue processing from the point of interruption. FIG. 4 illustrates one embodiment in which checksums can be utilized to enable a client to continue processing an interrupted select command. This view is similar to that of FIG. 2, and like reference numerals are employed to refer to like components.

According to one embodiment, whenever a client requests a select command to be executed by a database server, the database server returns to the client a database timestamp that reflects the snapshot of the database used to process the particular select command. The database timestamp is stored by the client and can be used to guarantee that a subsequent select command will return the same information as the previously executed select command, as long as both select commands employ the same select attributes.

In addition to the database timestamp, the client maintains both a row count and a cumulative row checksum. The row count indicates the number of rows successfully returned to the client in response to the initial execution of the select statement. The cumulative row checksum is a cumulative checksum of all rows successfully returned to the client. If a database session fails while executing a select command, the client uses the row count and cumulative row checksum to determine if a subsequent select command can be used to continue processing from the point of interruption.

For example, when user 200 requests the processing of a select command through database application 202, client driver interface 204 submits an initial select command to database 206 for execution through database session 218. Database server 206 executes the select command by retrieving the requested select data from database 214 and returns to client driver interface 204 a database timestamp that reflects the snapshot of the database used during the execution of the initial select command.

Database server 206 then begins transferring rows of select data back to client driver interface 204 in response to fetch commands received from the client. As rows of select data are received from database server 206, client driver interface 204 delivers the information to user 200. As each row of select data is received and then delivered to user 200, client driver interface 204 increments a row counter and calculates a cumulative checksum.

If database session 218 fails and the initial select command is interrupted before client driver interface 204 receives all of the select data, client driver interface 204 connects to database server 210 through database session 220 and attempts to continue processing the select command from the point of interruption. Once connected to database server 210 through database session 220, client driver interface 204 resubmits the select command to database server 210 along with the stored database timestamp.

The database server 210 executes the select command using a snapshot of the database that corresponds to the timestamp. As the resubmitted select command is executed and rows of data are fetched from database server 210, client driver interface 204 counts the number of returned rows and a maintains a second cumulative checksum. When the number of rows returned equals the number of rows previously returned, client driver interface 204 compares the second cumulative checksum with the previously stored cumulative checksum to determine whether the rows returned in response to the re-execution of the select statement are the same as the rows that were previously returned to the user. If so, then the results returned by the resubmitted select command were the same as the results previously returned by the initial select command. Thus, the results of the resubmitted select command may continue to be fetched to continue processing from the point of interruption.

As shown in FIG. 4, data 422 represents the initial select command that was interrupted by the failure of database session 218 while attempting to return five rows of select command data to client driver interface 204. Data 418 represents the three rows of data that were returned to client driver interface 204, before database session 218 failed and data 420 represents the two rows of data that had not been returned to client driver interface 204 before the failure of database session 218. Cumulative checksum 430 is the cumulative row checksum of data 418 and row count 408 is the number of rows of data that were returned to client driver interface 204 before database session 218 failed.

Data 424 depicts the resubmitted select command using the stored database timestamp and the order of rows returned to client driver interface 204 from database server 210. Data 416 represents the first three rows of data and data 414 represent the last two rows of data returned to client driver interface 204 after connecting to database session 210. Cumulative checksum 432 represents the cumulative row checksum of data 416, corresponding to the first three rows of data returned to client driver interface 204 after executing the resubmitted select command.

In the current example, although the row order of data 418 does not match the row order of data 416, cumulative checksums 430 and 432 are equal. Therefore, client driver interface 204 is assured that data 414 represents the two rows of data (data 420), that were not returned to client driver interface 204 before database session 218 failed. Thus, in this particular instance, client driver interface 204 can continue processing the interrupted select command and return to user 200 only those rows of data that were not previously returned when database session 218 failed.

However, in one embodiment, if cumulative checksums 430 and 432 are not equal, client driver interface 204 cannot continue processing the select command from the point that database session 218 failed. In this case, client driver interface 204 causes database server 210 to redeliver all rows of data from the resubmitted select command. Client driver interface 204 then returns the complete set of select data back to user 200.

In yet another embodiment, when cumulative checksums 430 and 432 are not equal, client driver interface 204 notifies user 200 that a database session failure occurred and that the interrupted select command cannot be completed. User 200 must then resubmit another select command with the corresponding attributes.

TRANSACTION PROCESSING RECOVERY

Referring again to FIG. 3, when a transaction is interrupted by the failure of database session 218, client driver interface 204 attempts to continue processing the interrupted transaction. In one embodiment, client driver interface 204 automatically causes database 214 to be rolled back to a state that was valid before database session 218 failed and the transaction was interrupted. Client driver interface 204 can then perform the necessary steps to continue processing the transaction. As mentioned above, pre-parsing may be used to reduce the amount of time required to complete any select command or transaction that was interrupted by failure of database session 220. Pre-parsing in described in detail below.

In another embodiment, savepoints are used to reduce the amount that client driver interface 204 must roll back database 214 to obtain a valid database state after the failure of database session 218. A savepoint is an intermediate marker that can be used to divide transactions into smaller components. At each savepoint, the database system flushes current transaction information to database 214. Thus, when a transaction is interrupted, client driver interface 204 need only rollback the transaction to the most resent savepoint and continue processing the interrupted transaction from the latest savepoint state. This can significantly reduce the extra processing that is required in rolling back the entire transaction and then resubmitting the whole transaction for processing.

In an alternate embodiment, database 214 is rolled back to a valid state whenever database session 218 fails. User 200 is notified that database session 218 failed and that a rollback has occurred. User 200 can then resubmit all select commands and transactions that were interrupted by failure of database session 218.

At step 314, client driver interface 204 notifies database application 202 that it is safe to continue accessing database 214. Client driver interface 204 may also cause user 200 to be notified of the status or results of the automatic failover event.

For example, in one embodiment, user 200 is notified that an automatic failover occurred and that user 200 may continue interfacing with database 214.

In another embodiment, user 200 is signaled or notified that a rollback of database 214 occurred and that one or more commands and/or instructions, need to be resubmitted.

In yet another embodiment, user 200 is signaled or notified of the status of the interrupted select command or transaction, once client 216 is connected to database server 210. The status, for example, may contain information as to whether the transaction completed successfully or that user 200 must resubmit part or all of the interrupted transaction. Additionally, the status may contain information as to whether the client driver interface 204 could successfully complete the select command or whether user 200 must resubmit the select command request.

At step 316, the automatic failover sequence is complete as database session 220 now connects client 216 to database server 210, enabling user 200 to continue accessing database 214 by causing client 216 to submit database language commands through session 220.

PRE-PARSING AT A BACKUP SERVER

Figure 5:
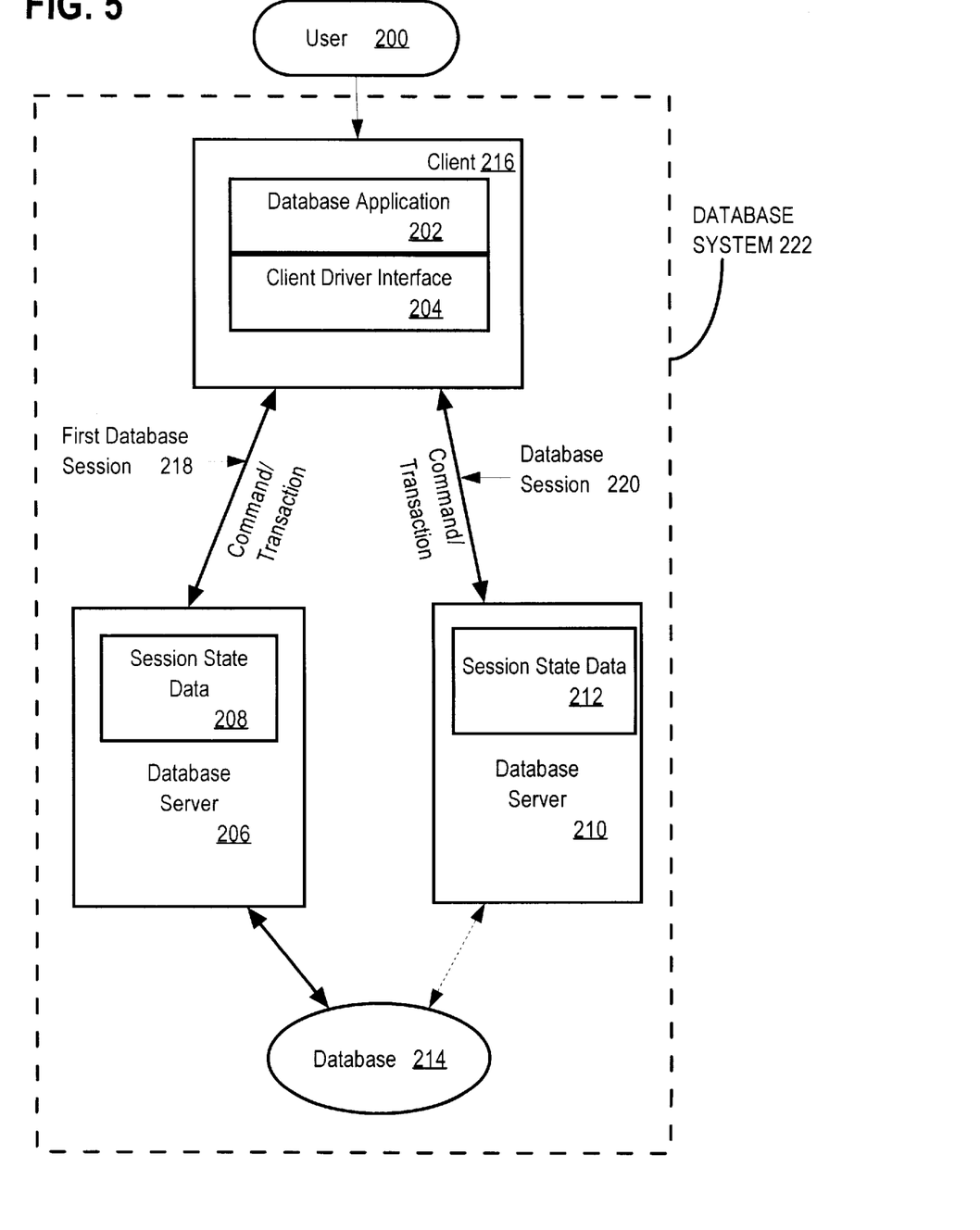
FIG. 5 is a block diagram of a database system in which the technique of pre-parsing is implemented to enable the completion of commands and transactions that were interrupted by a database session failure according to an embodiment of the invention.

Pre-parsing is a technique that can reduce the overhead associated with connecting to an active database server and. completing a command or transaction that was interrupted by the failure of a database session. FIG. 5 is an illustration of one embodiment that supports pre-parsing at a backup server. This view is similar to that of FIG. 2, and like reference numerals are employed to refer to like components.

The pre-parse mechanism requires that client 216 be connected to both database server 206 and database server 210. The connection from client 216 to database server 206 and database server 210 is through database session 218 and database session 220, respectively. Client driver interface 204 may establish these connections when user 200 initially logs on.

According to one embodiment, whenever client driver interface 204 submits a command or transaction to database server 206, client driver interface 204 causes the same command or transaction to be parsed, but not executed, on database server 210. This allows database server 210 and session state data 212 to reflect the identical state of database server 206 and session state data 208 respectively. Thus, when database session 218 fails, client driver interface 204 can continue processing any interrupted command or transaction on database server without having to resubmit the commands or transactions through database session 220.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for recovering after failure of a first connection that was established between a client and a first server for accessing a resource, the method comprising the steps of:

detecting that the first connection between said first server and said client has failed;

after detecting the first connection has failed, selecting a second server that has access to said resource; and automatically connecting said client with said second server to establish a second connection for accessing said resource.

2. The method of claim 1 wherein:

said step of detecting that the first connection between said first server and said client has failed includes the step of detecting that the first connection between a database server application that has access to the resource and a database client application has failed;

said step of automatically connecting said client with the second server includes the step of automatically connecting said database client application with a second database server application to establish a second connection for accessing said resource.

3. The method of claim 2 wherein the step of detecting that said first connection between said database client application and said first server has failed includes the step of detecting that the database server application has not responded within a threshold period of time.

4. The method of claim 1 wherein the step of detecting that the first connection between said first server and said client has failed includes the steps of:

detecting that said first connection between a database client application and said first server has failed; and notifying said application that said first connection has failed and that access to said resource through said first server has been lost.

5. The method of claim 4 wherein the step of detecting that said first connection between said database client application and said first server has failed includes the steps of:

said client initiating a callback request when making said first connection between said client and said first server, and said client responding to said callback request when said first connection between said client and said first server fails.

6. The method of claim 1 further comprising the step of said client causing said resource to be rolled back to a valid state.

7. The method of claim 1 wherein:

said first server is executing a select command when said first connection fails; and the method further comprises the step of said client causing said second server to complete execution of said select command after said client is connected to said second server.

8. The method of claim 1 wherein:

said client is causing said first server to execute a transaction when said first connection fails; and said client causes said second server to complete execution of said transaction after said client connects to said second server.

9. The method of claim 1 wherein:

the first connection between the first server and the client constitutes a session; the method includes the steps of maintaining values that reflect a state of said session at both said client and said first server, and communicating said values to said second server after failure of said first connection.

10. The method of claim 1 wherein:

said client is causing said first server to execute a transaction when said first connection fails; and said client causes said resource to be rolled back to a savepoint, wherein said savepoint represents an intermediate point in the execution of said transaction.

11. The method of claim 10 further comprising the step of said client causing said second server to complete the execution of said transaction from said save point after said client connects to said second server.

12. The method of claim 1 wherein:
said client is causing said first server to execute a database instruction when said first connection fails; and
the method further includes the steps of said client calculating a checksum based on results returned by said first server;
said client using said checksum to determine whether to cause said second server to continue executing said database instruction from where said database instruction was interrupted when said first server failed.

13. The method of claim 12 further comprising the step of said client using said checksum to complete the execution of said database instruction from where said database instruction was interrupted when said first connection failed after said client connects to said second server.

14. The method of claim 1 wherein the step of detecting that the first connection has failed includes the step of detecting that the first server has failed.

15. The method of claim 1 further comprises the step of:
after automatically connecting said client with said second sever, said client accessing said resource through said second server.

16. A computer-readable medium having stored thereon sequences of instructions for recovering after failure of a first connection that was established between a client and a first server for accessing a resource, the sequences of instructions including instructions for performing the steps of:
detecting that the first connection between said first server and said client has failed;
after detecting the first connection has failed, selecting a second server that has access to said resource; and
automatically connecting said client with said second server to establish a second connection for accessing said resource.

17. The computer-readable medium of claim 16 wherein:
said step of detecting that said first connection between said first server and said client has failed includes the step of detecting that the first connection between a database server application that has access to the resource and a database client application has failed;
said step of automatically connecting said client with the second server includes the step of automatically connecting said database client application with a second database server application to establish a second connection for accessing said resource.

18. The computer-readable medium of claim 17 wherein the step of detecting that said first connection between said database client application and said first server has failed includes the step of detecting that the first server has failed to respond within a predetermined period of time.

19. The computer-readable medium of claim 16 wherein the step of detecting that a connection between said first server and said client has failed includes the steps of:
detecting that said first connection between a database client application and said first server has failed; and
notifying said application that said first connection has failed and that access to said resource through said first server has been lost.

20. The computer-readable medium of claim 19 wherein the step of detecting that said first connection between said database client application and said first server has failed includes the steps of:
said client initiating a callback request when making said first connection between said client and said first server; and
said client responding to said callback request when said first connection between said client and said first server fails.

21. The computer-readable medium of claim 16 wherein the sequences of instructions further include instructions for performing the step of said client causing said resource to be rolled back to a valid state after connecting to said second server.

22. The computer-readable medium of claim 16 wherein:
said first server is executing a select command when said first connection fails; and
the sequences of instructions further include instructions for performing the step of said client causing said second server to complete execution of said select command after said client is connected to said second server.

23. The computer-readable medium of claim 16 wherein:
said client is causing said first server to execute a transaction when said first connection fails; and
said client causes said second server to complete execution of said transaction after said client connects to said second server.

24. The computer-readable medium of claim 16 wherein:
the first connection between the first server and the client constitutes a session;
the sequences of instructions further includes instructions for performing the steps of
maintaining values that reflect a state of said session at both said client and said first server; and
communicating said values to said second server after failure of said first connection.

25. The computer-readable medium of claim 16 wherein the step of detecting that the first connection has failed includes the step of detecting that the first server has failed.

26. The computer-readable medium of claim 16 further comprising instructions for performing the step of:
after automatically connecting said client with said second sever, said client accessing said resource through said second server.

27. A method for completing a transaction after failure of a first connection that was established between a client and a first server for accessing a resource, the method comprising the steps of:
performing a first portion of the transaction on the first server;
detecting that the first connection between said first server and said client has failed;
after detecting that the first connection between said first server and said client has failed, automatically establishing a second connection between said client and a second server that has access to said resource; and
performing a second portion of the transaction on the second server to complete the transaction, wherein performance of the first portion of the transaction includes performance of at least some operations that are not performed by the second portion of the transaction.

28. The method of claim 27 wherein:
the step of performing a first portion of the transaction includes the step of initiating a select command when said first server fails; and
the method further comprises the step of said client causing said second server to complete execution of said select command after said client is connected to said second server.

29. The method of claim 27 wherein:
the first connection between the first server and the client constitutes a session, the method includes the steps of maintaining values that reflect a state of said session at both said client and said first server; and
communicating said values to said second server after failure of said first connection.

30. The method of claim 27 wherein:
the step of performing the fist portion of the transaction includes the step of maintaining a savepoint that represents an intermediate point in the execution of said transaction;
the step of automatically establishing the second connection includes the step of causing said resource to be rolled back to the savepoint; and
the step of performing the second portion of the transaction includes the step of causing said second server to complete the execution of the transaction from said savepoint after said client connects to said second server.

31. A method for recovering after failure of a first connection that was established between a client and a first server for accessing a resource, wherein
said first connection constitutes a session between said client and said first server,
the method comprising the steps of:
executing commands sent by said client to said first server using said session, wherein said session has a state that changes in response to said first server executing said commands; and
prior to failure of the first connection,
establishing a second connection between the client and a second server that has access to said resource; and
pre-parsing on said second server, without executing on said second server, commands sent by said client to said first server.

32. A computer-readable medium having stored thereon sequences of instructions for completing a transaction after failure of a first connection that was established between a client and a first server for accessing a resource, the sequences of instructions including instructions for performing the steps of:
performing a first portion of the transaction on the first server;
detecting that the first connection between said first server and said client has failed;
after detecting that the first connection between said first server and said client has failed, automatically establishing a second connection between said client and a second server that has access to said resource; and
performing a second portion of the transaction on the second server to complete the transaction, wherein performance of the first portion of the transaction includes performance of at least some operations that are not performed by the second portion of the transaction.

33. The computer-readable medium of claim 32 wherein:
the step of performing a first portion of the transaction includes the step of initiating a select command when said first server fails; and
the computer-readable medium further comprising instructions for performing the step of said client causing said second server to complete execution of said select command after said client is connected to said second server.

34. The computer-readable medium of claim 32 wherein:
the first connection between the first server and the client constitutes a session;
the computer-readable medium further including instructions for performing the steps of
maintaining values that reflect a state of said session at both said client and said first server; and
communicating said values to said second server after failure of said first connection.

35. The computer-readable medium of claim 32 wherein:
the step of performing the first portion of the transaction includes the step of maintaining a savepoint that represents an intermediate point in the execution of said transaction;
the step of automatically establishing the second connection includes the step of causing said resource to be rolled back to the savepoint; and
the step of performing the second portion of the transaction includes the step of causing said second server to complete the execution of the transaction from said savepoint after said client connects to said second server.

36. A computer-readable medium having stored thereon sequences of instructions for recovering after failure of a first connection that was established between a client and a first server for accessing a resource, wherein said first connection constitutes a session between said client and said first server, the sequences of instructions including instructions for performing the steps of:
executing commands sent by said client to said first server using said session, wherein said session has a state that changes in response to said first server executing said commands; and
prior to failure of the first connection, establishing a second connection between the client and a second server that has access to said resource; and
pre-parsing on said second server, without executing on said second server, commands sent by said client to said first server.

37. A method for recovering after failure of a first connection that was established between a client and a first server for accessing a resource, the method comprising the steps of:
prior to failure of the first connection,
initiating a first transaction on the first server, wherein the transaction causes a first set of data to be sent to an application executing on said client;
detecting that the first connection between said first server and said client has failed, wherein the failure of the first connection causes the first transaction to be interrupted; and
after detecting the first connection has failed, selecting a second server that has access to said resource;
automatically connecting said client with said second server to establish a second connection for accessing said resource;
initiating a second transaction, wherein the second transaction is based on the first transaction; and
sending a second set of data to the application, where the second set of data causes the failure to be transparent to the application.

* * * * *

UNITED STATES PATENT AND TRADEMARK OFFICE
CERTIFICATE OF CORRECTION

PATENT NO. : 6,490,610 B1
DATED : December 3, 2002
INVENTOR(S) : Hasan Rizvi et al.

It is certified that error appears in the above-identified patent and that said Letters Patent is hereby corrected as shown below:

Column 13,
Line 11, "the fist" should read -- the first --;

Column 14,
Line 16, "resents" should read -- represents --.

Signed and Sealed this

Seventeenth Day of June, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,490,610 B1
DATED : December 3, 2002
INVENTOR(S) : Hasan Rizvi et al.

It is certified that error appears in the above-identified patent and that said Letters Patent is hereby corrected as shown below:

<u>Column 11,</u>
Line 28, "sever," should read -- server, --;

<u>Column 14,</u>
Line 16, "represents" should read -- resents --;

Signed and Sealed this

Twenty-fourth Day of February, 2004

JON W. DUDAS
*Acting Director of the United States Patent and Trademark Office*